United States Patent
Herrmann et al.

(10) Patent No.: US 10,014,709 B2
(45) Date of Patent: Jul. 3, 2018

(54) CHARGING APPARATUS, SYSTEM AND METHOD

(71) Applicant: MOTOROLA SOLUTIONS, INC, Schaumburg, IL (US)

(72) Inventors: John E. Herrmann, Suwanee, GA (US); Scott H. Richards, Plantation, FL (US); Chi T. Tran, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 207 days.

(21) Appl. No.: 14/663,817

(22) Filed: Mar. 20, 2015

(65) Prior Publication Data

US 2016/0276862 A1    Sep. 22, 2016

(51) Int. Cl.
  *H02J 7/02* (2016.01)
  *H02J 7/00* (2006.01)
  *H02J 50/90* (2016.01)

(52) U.S. Cl.
  CPC .............. *H02J 7/025* (2013.01); *H02J 7/0042* (2013.01); *H02J 7/0045* (2013.01); *H02J 50/90* (2016.02)

(58) Field of Classification Search
  CPC .............. H02J 7/025; H02J 50/40; H02J 50/50
  USPC ........................................................ 320/108
  See application file for complete search history.

(56) References Cited

U.S. PATENT DOCUMENTS

| | | | | |
|---|---|---|---|---|
| 5,898,472 A | * | 4/1999 | Oshikawa | G02C 3/02 351/156 |
| 7,855,529 B2 | * | 12/2010 | Liu | G06F 1/1632 320/108 |
| 9,537,321 B2 | | 1/2017 | Oo et al. | |
| 2008/0169998 A1 | * | 7/2008 | Jacobsen | G02B 27/0172 345/8 |
| 2011/0018498 A1 | * | 1/2011 | Soar | B60N 2/44 320/108 |
| 2011/0222153 A1 | | 9/2011 | Agarwal et al. | |
| 2011/0222154 A1 | | 9/2011 | Choi et al. | |
| 2012/0032631 A1 | * | 2/2012 | Bourilkov | H02J 7/025 320/108 |
| 2012/0062173 A1 | | 3/2012 | Choi et al. | |
| 2013/0049672 A1 | | 2/2013 | Taylor | |
| 2013/0214931 A1 | | 8/2013 | Chia | |

(Continued)

FOREIGN PATENT DOCUMENTS

WO        2013096885 A1    6/2013

OTHER PUBLICATIONS

The International Search Report and the Written Opinion, International Application No. PCT/US2016/021126, filed: Mar. 7, 2016, dated Jun. 10, 2016, all pages.

(Continued)

*Primary Examiner* — Nathaniel Pelton
*Assistant Examiner* — Johali Torres Ruiz
(74) *Attorney, Agent, or Firm* — Barbara R. Doutre

(57) ABSTRACT

A charging accessory (104) is provided. The charging accessory (104) comprises a mechanical attachment device, such as a clip (110), and a receive coil (112) integrated within the clip, the receive coil for receiving a wireless charging signal (118). A wearable lanyard (126) is coupled to the clip (110) for transferring power and charging signals. The charging accessory (104) can be worn and operated within a charging system (100) to power and charge a wearable electronic device (102).

25 Claims, 4 Drawing Sheets

(56) References Cited

U.S. PATENT DOCUMENTS

| | | | | |
|---|---|---|---|---|
| 2014/0037102 A1* | 2/2014 | Alanis | ................ | H04R 1/1041 |
| | | | | 381/74 |
| 2014/0152248 A1* | 6/2014 | Yeh | ................ | H02J 50/10 |
| | | | | 320/108 |
| 2014/0228082 A1* | 8/2014 | Morrow | ................ | H04B 1/3888 |
| | | | | 455/575.8 |
| 2014/0265614 A1* | 9/2014 | Kim | ................ | H01F 38/14 |
| | | | | 307/104 |
| 2015/0280763 A1* | 10/2015 | Ko | ................ | H04B 1/385 |
| | | | | 455/73 |
| 2015/0340902 A1* | 11/2015 | Luukkainen | ................ | H02J 7/02 |
| | | | | 320/108 |

OTHER PUBLICATIONS

Desai et al—U.S. Appl. No. 14/524,533, filed Oct. 27, 2014—entitled: Method and Apparatus for Optimally Located Device to Be Charged in a Charging Area of a Wireless Charger.

Lun OO et al—U.S. Appl. No. 14/631,030, filed Feb. 25, 2015—entitled: Method and Apparatus for Power Transfer for a Portable Electronic Device.

Jakl et al—U.S. Appl. No. 14/541,190, filed Nov. 14, 2014—entitled: Method and Apparatus for Efficiency Compliance in Wireless Charging Systems.

* cited by examiner

CHARGING APPARATUS, SYSTEM AND METHOD

FIELD OF THE DISCLOSURE

The present disclosure relates generally to wearable electronic devices, and more particularly to the charging of wearable electronic devices.

BACKGROUND

The charging of wearable electronic devices can be cumbersome. In most cases, the wearable device must be removed from the user in order to charge the device, disrupting device usage. Wireless charging that is transparent to the user would be especially beneficial in such cases. Wireless charging typically utilizes a receive coil housed within the device to be charged. However, the receive coil for many body worn, portable electronic devices would need to be prohibitively large to ensure efficient power transfer. Smaller wearable electronic devices do not have the space to accommodate a large receive coil.

Accordingly, it would be desirable to have an improved apparatus, system and method for charging and/or powering a wearable electronic device. An approach that would allow charging while the device is being worn would be particularly beneficial.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
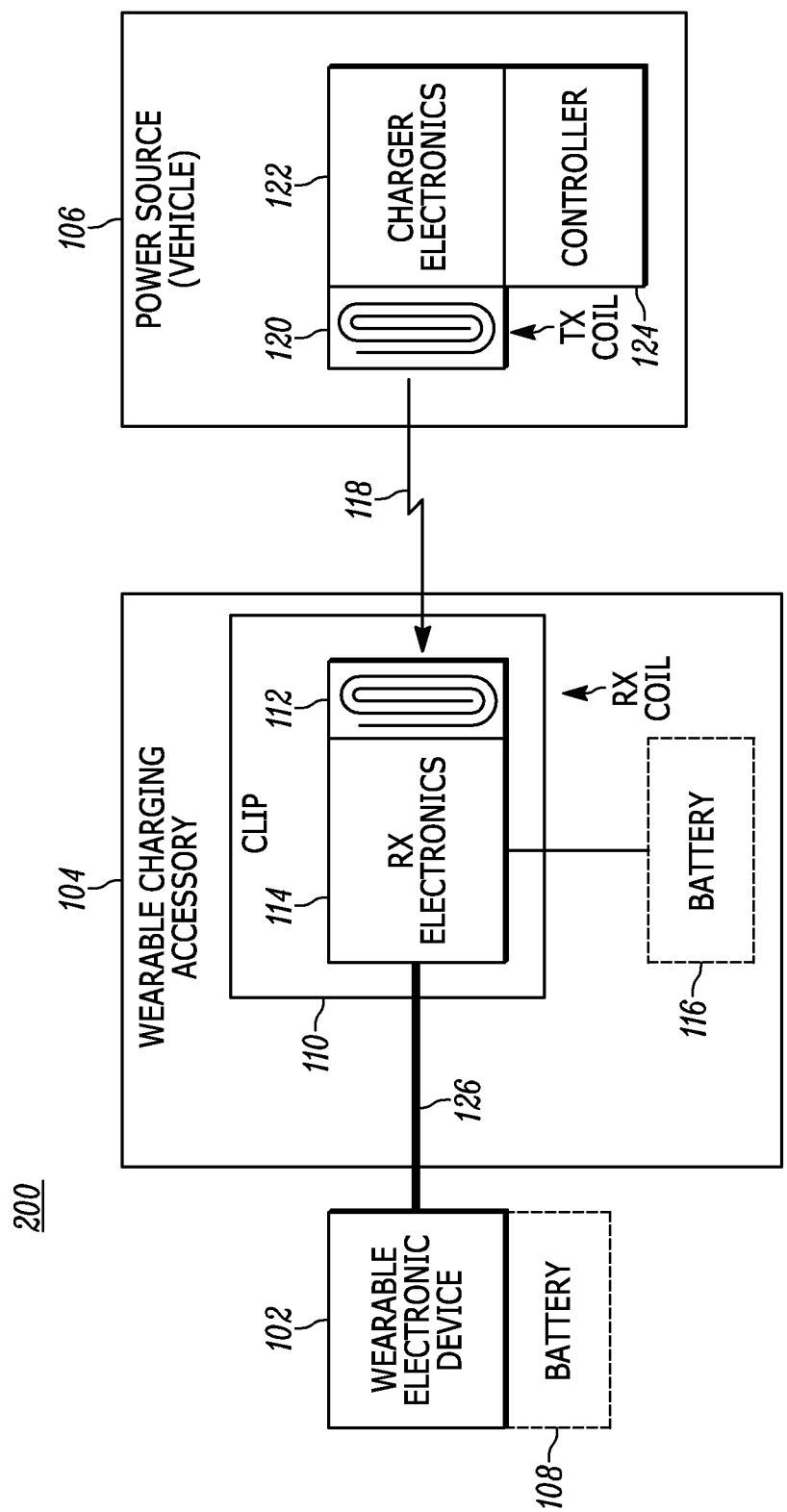
FIG. 1 is a block diagram of a charging system having a charging accessory in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a charging accessory formed and operating in accordance with various embodiments. The charging accessory is a wearable charging accessory comprising a tether, such as a lanyard, strap, or cable, having a mechanical attachment device, for example a clip, with a receive coil integrated therein or coupled thereto. The receive coil charges a battery in response to receiving a wireless charging signal. The charging accessory can be worn and operated within a charging system to power and charge a wearable electronic device. A wearable electronic device having a battery can be charged by coupling the charging accessory to the wearable electronic device, receiving a charging signal at the receive coil integrated within the charging accessory and charging the battery with the charging signal. A wearable electronic device not having a battery can be powered by coupling a charging accessory device having a battery to the wearable electronic device. The battery of the charging accessory can be charged similarly by receiving a charging signal at the receive coil integrated within the charging accessory, and charging the battery of the charging accessory with the charging signal which in turn powers the non-battery wearable electronic device. Powering of the wearable electronic device and charging the battery (regardless of whether the battery is located in the charging accessory or the wearable electronic device) can advantageously occur simultaneously while the wearable electronic device and the charging accessory are being worn.

FIG. 1 is a block diagram of a charging system 100 in accordance with some embodiments. Charging system 100 comprises a wearable electronic device 102, a wearable charging accessory 104, and a power source 106. The wearable electronic device 102 may comprise, for example, electronic eyeglasses, wireless push-to-talk (PTT), body worn camera, remote microphone, remote speaker-microphone, body-worn sensors or other wearable electronic device that may be worn by a user. Charging system 100 comprises at least one battery to be charged (shown here as battery 108 and/or battery 116). The wearable electronic device 102 may, or may not, have a battery. For example, a battery 108 may be located in the wearable electronic device 102 and/or a battery 116 may be located in the wearable charging accessory 104. In accordance with the embodiments, the battery (108 or 116) being charged is the battery used to power the wearable electronic device 102. In accordance with some embodiments, the wearable charging accessory 104 may interchangeably couple to a plurality of different wearable devices.

In accordance with some embodiments, the wearable charging accessory 104 may comprise a lanyard, a strap, a cable, or some similar tethering device 126, having a mechanical attachment device 110 coupled thereto or integrated therein. The mechanical attachment device 110 may comprise, for example, a clip, hook and loop fastener material (e.g. Velcro®), magnet or other mechanical attachment device to which the receive coil 112 is coupled or integrated. In accordance with various embodiments, the mechanical attachment device 110, coupled to the receive coil 112, provides for attachment of the receive coil to an external device. For the purposes of this application, the external device comprises a garment or other article of clothing. Henceforth, for the purposes of description, the mechanical attachment device 110 will be described as a clip 110.

In accordance with some embodiments, the clip 110 comprises a receive coil 112 and may further comprise some or all receive electronics 114 integrated therein. The receive electronics 114 of the wearable charging accessory 104 may comprise, for example, matching circuitry, rectifier filters and voltage converters, as known in the art, to provide a properly regulated charge to a battery, such as battery 116 and/or battery 108. The supporting receive electronics 114 may be all or partially integrated within the wearable charging accessory 104 either within the clip 110 or portions of the lanyard 126. The receive coil 112 receives a wireless charging signal 118 from the power source 106 to charge the battery 116 and/or battery 108.

Power source 106 transmits the wireless charging signal 118 thereby magnetically coupling with the receive coil 112, said wireless charging signal 118 being generated by a transmit (TX) coil 120 energized by charger electronics 122, and controller 124 of the power source 106. The charger electronics 122 of the power source 106 may comprise, for example, matching circuitry, rectifier filters and voltage converters, as known in the charging art, under control of controller 124.

The power source 106 may be integrated or coupled within a remote apparatus, such as a vehicle or a chair having its own battery (shown later). Placement of the transmit coil 120 within the remote apparatus is determined based on the location of the receive coil 112, when the wearable charging accessory 104 is being worn by a user. For example, the wearable electronic device 102 tethered via the wearable charging accessory 104 can be clipped via clip 110 to a user's collar to receive the wireless charging signal 118 from a transmit coil 120 placed on or about a headrest or upper portion of a seat within a vehicle. Such usage application and others are described next.

The receive coil 112 is advantageously used to charge the battery regardless of whether the battery is located in the wearable electronic device (e.g. battery 108) or the wearable charging accessory (e.g. battery 116).

For embodiments of the charging system 100 in which the wearable electronic device 102 has no battery, and in which the wearable charging accessory 104 does have a battery 116, the wearable charging accessory 104 can charge the battery 116 and power the wearable electronic device 102 at the same time.

For embodiments of the charging system 100 in which the wearable electronic device 102 does have a battery, such as battery 108, and in which the wearable charging accessory 104 does not have a battery, the wearable charging accessory 104 charges the battery 108 which in turn powers the wearable electronic device 102 at the same time.

As will be further described in the subsequent figures, the integration of the receive coil into a clip, or other mechanical attachment device, minimizes relative motion between transmit (Tx) and receive (Rx) coil thereby enabling efficient power transfer. The ability to charge devices while being worn is likewise advantageous for public safety personnel working in the field. The adjustability of placement location of the clip, or other mechanical attachment device having the receive coil, provides a further advantage to the wearable charging accessory.

Figure 2:
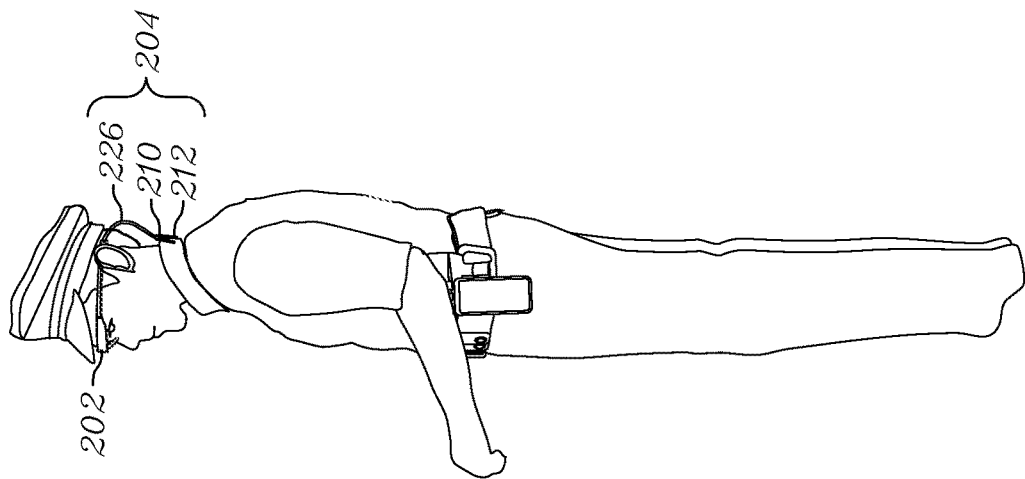
FIG. 2 is an example of a usage application for a charger system comprising a wearable charging accessory formed and operating in accordance with some embodiments.
Figure 2:
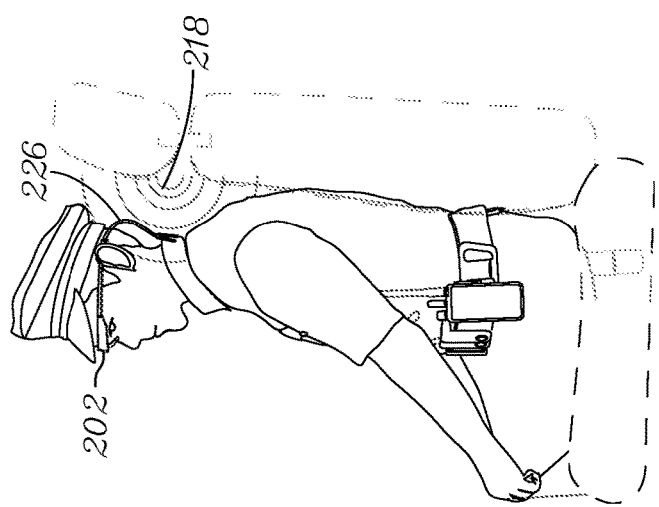
Figure 2:
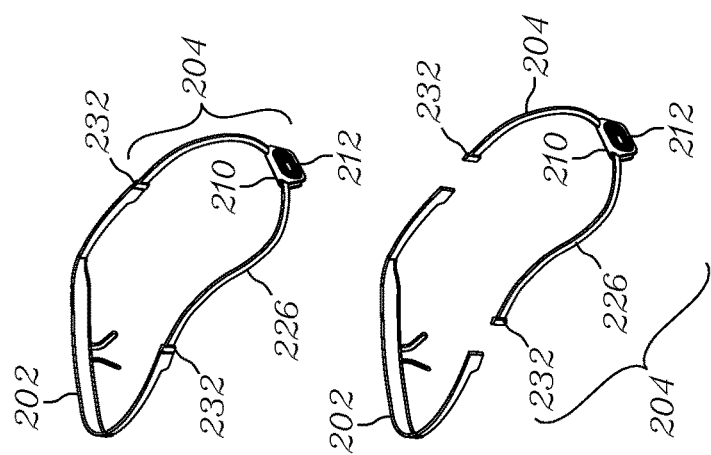

FIG. 2 is an example of a usage application for a charger system 200 comprising a wearable charging accessory 204 formed and operating in accordance with some embodiments. In this example, the wearable electronic device 102 of FIG. 1 comprises electronic eyeglasses 202. In accordance with this embodiment, the wearable charging accessory 204 comprises a lanyard 226 having a clip 210, and a receive coil 212 is integrated within the wearable charging accessory 204 at clip 210. Receive electronics 214 may be coupled within clip 210 and/or elsewhere on the lanyard 226. For example, small circuit boards and/or flex can be used to integrate circuitry within the lanyard 226 and/or clip 210. A battery, such as battery 116, may be coupled to the lanyard, for example at clip 210 or elsewhere on the lanyard 226 and/or a battery, such as battery 108, may be located in the electronic eyeglasses 202. The receive coil 212 is clipped, via clip 210 to optimize placement relative to a power source 206. For example, the receive coil 212 may be clipped, via clip 210, to a user's collar to optimize placement relative to a power source 206 located in a backrest or neckrest 230 of a vehicle. Clipping of the clip 210 to appropriate locations on a user's garment or clothing ensures alignment with a variety of different power source locations. In this example, the collar is an appropriate location for tethering electronic eyeglasses while worn by a user.

The lanyard 226 is coupled, such as through wires (not shown) within the lanyard, to an interconnect 232. The interconnect 232 of the lanyard 226 may comprise an electromechanical interconnect known in the art which attaches, plugs or otherwise couples to the electronic eyeglasses 202. In this example, the lanyard comprises two straps on either side of the clip 210, each strap having a respective interconnect for interconnecting to the electronic eyeglasses 202. In accordance with some embodiments, only one side/strap requires the electromechanical interconnect for the transfer of signals.)

In operation, for an application in which the wearable charging accessory 204 has the battery 216, the receive coil 212 of the clip 210 charges the battery 216 in response to wireless charging signal 218 and the battery 216 powers the eyeglasses via interconnect 232. Thus, both charging of the battery in the accessory and power to the electronic eyeglasses 202 by the lanyard 226.

In operation, for an application in which the wearable charging accessory 204 does not have a battery, but in which the electronic eyeglasses 202 do have a battery 208, the receive coil 212 of the clip 210 charges the battery 208 of the electronic eyeglasses 202 in response to wireless charging signal 218. The electronic eyeglasses 202 are then powered by the eyeglass battery 208.

Accordingly, both embodiments allow for charging and powering at the same time. The lanyard is being used to convey charge current to the electronic glasses when a battery is located in the glasses. The lanyard is being used to supply power to the electronic glasses when a battery is located in the wearable charging accessory.

The integration of the coil 212 into the clip 210 within the lanyard 226 is particularly beneficial to achieving a body worn approach. The electronic eyeglasses, for example, can now be charged while being worn on the body without having to remove the glasses to place them in a charging cradle.

Clipping of the clip 210 to appropriate locations on a user's garment or clothing ensures alignment of the receive coil 212 with a variety of different power source locations. The use of a clip advantageously allows for a larger coil to be used, and that coil is located in a dedicated charging accessory which is easily worn by the user. Having the receive coil 212 situated in the clip 210 of the dedicated charging accessory 204 (as opposed to the electronic eyeglasses 202) allows a larger coil to be used without hampering the user. The use of the clip 210 allows the coil to be better aligned with the charging element power source 206 as the accessory device remains properly oriented to the user. Having the receive coil 212 situated in mechanical attachment device, here clip 210, allows the placement of the receive coil to be adjusted relative to the power source 206. The tether 226 and clip 210 further prevent the wearable electronic device from falling off of the user. The charging advantageously eliminates the need for a contact interface (non-wireless charging) to the power source 206.

The lanyard is shown in FIG. 2 as having two straps which is appropriate for use with electronic eyeglasses. However the wearable charging accessory may be embodied with a single strap for tethering to other wearable electronic devices, such as wireless PTT, body worn camera, microphone, sensors to name a few. The tether having clip and receive coil integrated therein is thus well suited to a variety of body worn electronic devices.

Figure 3:
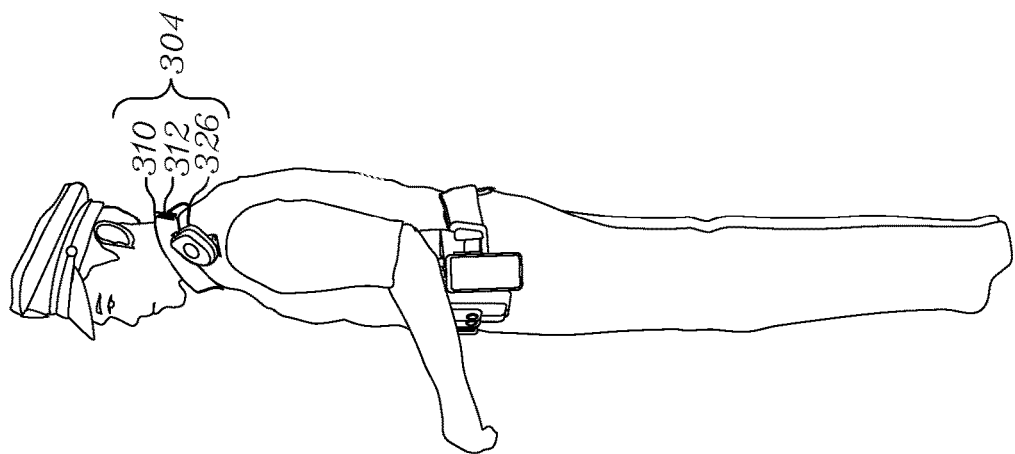
FIG. 3 is an example of another usage application for a charger system comprising the wearable charging accessory formed and operating in accordance with some embodiments.
Figure 3:
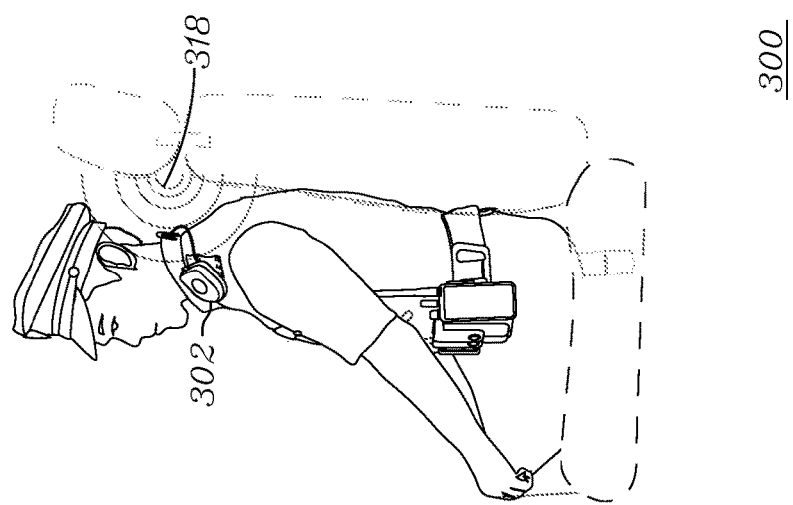
Figure 3:
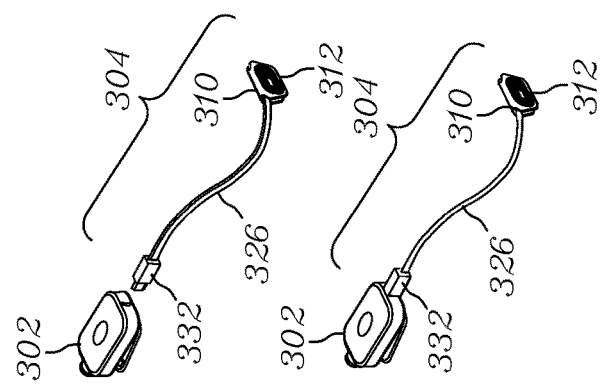

FIG. 3 is another example of a usage application for a charger system 300 comprising a wearable charging accessory 304 formed and operating in accordance with some embodiments. In this example, the wearable electronic device 102 of FIG. 1 comprises a wireless push-to-talk (PTT) 302. In accordance with some embodiments, the wearable charging accessory 304 comprises a lanyard 326 having a clip 310, and a receive coil 312 is integrated within the clip 310. Receive electronics 314 may be coupled within clip 310 and/or elsewhere on the lanyard 326 using flex, circuit board or other known technology. A battery, such as battery 116, may be coupled to the lanyard, for example at clip 310 or integrated elsewhere on the lanyard, and/or a battery, such as battery 108, may be located in the wireless PTT 302. The receive coil 312 is clipped, via clip 310, to a location on the user's garment that optimizes placement relative to a power source 306. For example, the receive coil 312 may be clipped, via clip 310, to the user's collar to optimize placement relative to power source 306, located in a backrest or neckrest 330 of a vehicle. Clipping of the clip 310 to appropriate locations on a user's garment or clothing ensures alignment with a variety of different power source locations. In this example, the collar is an appropriate location for tethering wireless PTT 302 while worn by a user.

In this example, the lanyard 326 is a single strap lanyard coupled to an interconnect 232 such as through wires or flex (not shown) within the lanyard. The interconnect 232 of the lanyard 326 may comprise an electromechanical interconnect known in the art which attaches, plugs or otherwise couples to the wireless PTT 302.

In operation, for an application in which the wearable charging accessory 304 has a battery, such as battery 116 of FIG. 1, the receive coil 312 charges the battery in response to wireless charging signal 318, and the battery powers the wireless PTT 302 via electronic interconnect 332. Thus, both charging and power are provided to the wireless PTT 302 through the lanyard 226.

In operation, for an application in which the wearable charging accessory 304 does not have a battery, but in which the wireless PTT 302 does have a battery, such as battery 108 of FIG. 1, the receive coil 312 charges the battery of the wireless PTT 302 in response to wireless charging signal 318. The wireless PTT 302 is then powered by the PTT battery.

Accordingly, both operational functions allow for charging and powering at the same time. The lanyard 326 is being used to convey charge current to the wireless PTT 302 when a battery is located in the PTT. The lanyard is being used to supply power to the PTT 302 when a battery is located in the wearable charging accessory 304.

Referring to FIGS. 1 and 2, as mentioned previously, the electromechanical interconnect 232, 332 of the lanyard 226, 326 attaches, plugs or otherwise couples to the wearable electronic device 202, 302. In accordance with some embodiments, the at least one an interconnect is coupled to the lanyard 226, 326 to provide output signals from the charging accessory device (power signal and/or charging signal) for charging and/or powering the wearable electronic device 202, 302. In accordance with some embodiments, the interface connector(s) used is based on the type of wearable electronic device. For example, a universal serial bus (USB) or other interconnect between the two devices may be used to transfer additional data information back and forth between the two devices. For example, if the wearable electronic device is a sensor, the interconnect may convey information between the sensor and the wearable charging accessory pertaining to biometric sensors and/or radiation sensors, such as temperature, smoke, motion, RF, heat, radioactive decay, acceleration, speed, proximity, and position to name a few.

While the clip 210 and clip 310 have been shown clipped to a user's collar, the location may be adjusted depending on the location of the power source and the device to be charged or powered. For example, for a power source located in front of the user (attach clip 310 to the front of garment for charging a body worn camera), for a power source located to the side of the user (attach clip 310 to sleeve of garment for powering a shoulder worn remote microphone or body sensor), for a power source located behind the user such as in a car seat (attach clip 310 to back-pocket of garment for charging a radio). The adjustability of clip placement is a further advantage to the wearable charging accessory. Non-vehicular examples of power source locations, such as a chair having a power source (battery and transmit coil) may also make use of the various embodiments of the invention.

Figure 4:
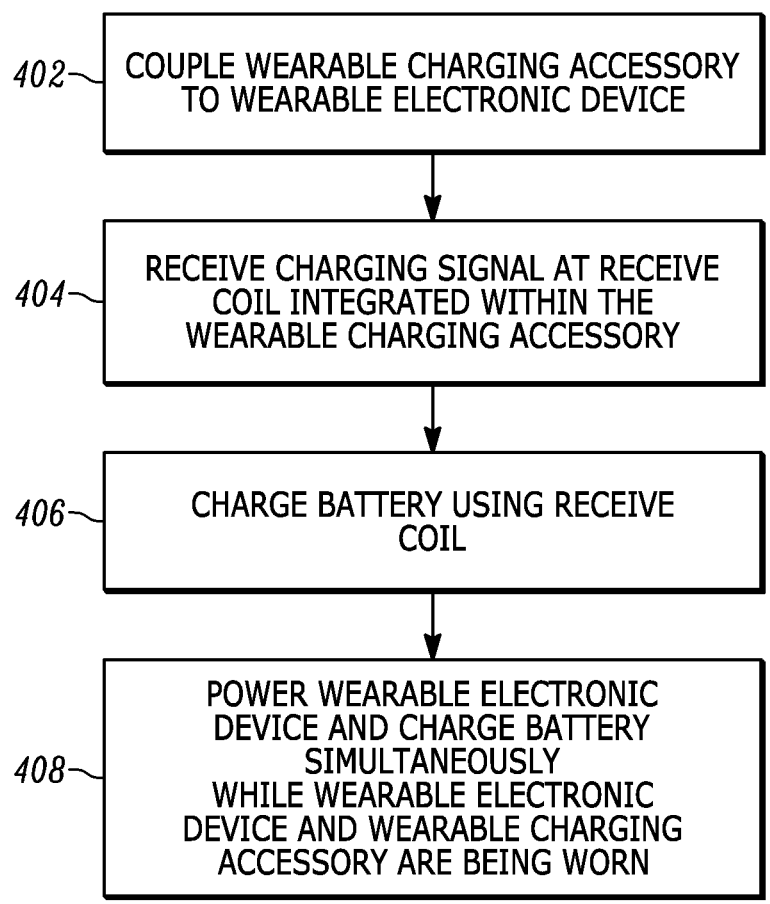
FIG. 4 is a method of charging and powering a wearable electronic device in accordance with some embodiments.

A flowchart shown in FIG. 4 describes a method 400 of charging and powering a wearable electronic device in accordance with some of the embodiments. Method 400 begins by coupling a wearable charging accessory, via a tether, to the wearable electronic device at 402 followed by receiving a charging signal at a receive coil integrated within the wearable charging accessory at 404. In accordance with some of the embodiments, the receive coil is integrated within a clip of the tether such as previously described. At 406, a battery is charged with a battery charging signal generated from electronics associated with the receive coil. The battery being charged may be integrated within the wearable charging accessory or may be located in the wearable electronic device. Method 400 continues at 408 by powering the wearable electronic device and charging the battery simultaneously while the wearable electronic device and the wearable accessory device are being worn.

In accordance with various embodiments, the method 400 may further comprise interchangeably coupling different wearable electronic devices to the wearable charging accessory. Each of the different wearable electronic devices may advantageously be powered and charged simultaneously while being worn.

In accordance with various embodiments, the method may further comprise between coupling 402 and receiving 404, transmitting the charging signal from a transmit coil located, for example, within a vehicle, such as a seat, a dash and/or a window of a vehicle. The transmit coil may also be located in a chair. The wearable accessory device may comprise a lanyard, and the wearable electronic device may comprise electronic eyeglasses, wireless PTT, sensors, body worn camera, body worn body worn microphone, remote speaker microphone, to name a few.

Wearable electronic devices such as, but not limited to, electronic eyeglasses, ear pieces, and body-worn sensors can all benefit from the wearable charging apparatus, method and system provided by the various embodiments. The wearable charging apparatus and method facilitates wireless power transfer to wearable devices via wearable articles which is particularly advantageous in the public safety arena. The ability to minimize relative motion between transmit (Tx) and receive (Rx) coils through the integration of the receive coil into a clip enables efficient power transfer and the use of a larger coil than would typically fit in a wearable electronic device. The ability to use a larger coil on the accessory side also facilitates the ability to charge a plurality of different wearable electronic devices having different charge needs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A charging accessory, comprising:
   a receive coil for wirelessly magnetically coupling with a transmit coil of a remote power source; and
   a mechanical attachment device coupled to the receive coil for attachment of the receive coil to an external device, the mechanical attachment device providing adjustable wearable placement of the receive coil relative to the remote power source for remote wearable wireless charging of the receive coil, wherein the mechanical attachment device comprises a clip, the clip being coupled to the receive coil, the receive coil for receiving a wireless magnetic charging signal; and
   a wearable lanyard coupled to the clip.

2. The charging accessory of claim 1, wherein the mechanical attachment device comprises a clip, VELCRO or a magnet.

3. The charging accessory of claim 1, wherein the mechanical attachment device is coupled to a lanyard.

4. The charging accessory of claim 1, further comprising:
   receive electronics coupled to the receive coil, the receive electronics generating a battery charging signal in response to the receive coil receiving the wireless magnetic charging signal.

5. The charging accessory of claim 4, further comprising:
   a battery integrated within the wearable lanyard, the battery charging signal for charging the battery.

6. The charging accessory of claim 5, wherein the battery integrated within the wearable lanyard provides power to a wearable electronic device coupled to the wearable lanyard.

7. The charging accessory of claim 1, further comprising:
at least one electromechanical interconnect coupled to the wearable lanyard.

8. The charging accessory of claim 7, wherein the at least one electromechanical interconnect couples to a plurality of interchangeable wearable electronic devices.

9. The charging accessory of claim 1, further comprising:
a battery integrated within the charging accessory;
receive electronics coupled to the receive coil, the receive electronics generating a battery charging signal in response to the receive coil receiving the wireless charging signal, the battery charging signal for charging the battery; and
at least one electromechanical interconnect coupled to the wearable lanyard, wherein a battery power output signal from the battery is provided to the at least one electromechanical interconnect.

10. The charging accessory of claim 1, further comprising:
receive electronics coupled to the receive coil, the receive electronics generating a battery charging signal in response to the receive coil receiving the wireless charging signal; and
at least one electromechanical interconnect coupled to the wearable lanyard, wherein the battery charging signal is provided to the electromechanical interconnect as an output.

11. The charging accessory of claim 1, wherein the receive charging coil magnetically couples with the remote power source transmitting a wireless charging signal, the power source having its own battery.

12. A charging system, comprising:
a wearable electronic device;
a wearable charging accessory comprising a tether having a clip, the wearable charging accessory for tethering to the wearable electronic device;
at least one battery for powering the wearable electronic device; and
a receive charging coil integrated within the clip of the wearable charging accessory, the receive charging coil for charging the at least one battery, the receive charging coil wirelessly magnetically coupling with a transmit coil of a remote power source, wherein the tether and clip provide adjustable wearable placement of the receive charging coil relative to the remote power source for remote wearable wireless charging.

13. The charging system of claim 12, wherein the at least one battery is located in the wearable electronic device.

14. The charging system of claim 12, wherein the at least one battery is located in the wearable charging accessory.

15. The charging system of claim 12, wherein the receive coil charges the at least one battery in response to receiving a wireless charging signal.

16. The charging system of claim 15, wherein the wireless charging signal is transmitted from a transmit coil coupled to a component of a vehicle.

17. The charging system of claim 16, wherein the clip provides alignment of the receive coil with the transmit coil and further prevents the wearable charging accessory from falling.

18. The charging system of claim 12, wherein the wearable charging accessory interchangeably couples to a plurality of different wearable electronic devices.

19. The charging system of claim 12, wherein the wearable charging accessory is tethered to the wearable electronic device via a lanyard, a strap or a belt.

20. The charging system of claim 12, wherein the wearable electronic device comprises at least one of: electronic eyeglasses, on-body sensors, a wireless push-to-talk (PTT), a wearable camera, and a wearable microphone.

21. The charging system of claim 12, wherein the receive charging coil magnetically couples with a transmit coil of the remote power source, the remote power source having its own battery.

22. A method of charging and powering a wearable electronic device, comprising:
coupling a wearable charging accessory having a tether to the wearable electronic device;
receiving a wireless magnetic charging signal at a receive charging coil integrated within a clip of the tether;
charging a battery with the receive coil of the clip; and
powering the wearable electronic device with the charged battery, while simultaneously charging the battery, the receive charging coil wirelessly magnetically coupling with a transmit coil of a remote power source, wherein the tether and clip provide adjustable wearable placement of the receive charging coil relative to the remote power source for remote wearable wireless charging.

23. The method of claim 22, wherein the battery being charged is integrated within at least one of:
the wearable charging accessory; and
the wearable electronic device.

24. The method of claim 22, wherein the simultaneous powering and charging occur while the wearable electronic device and the wearable charging accessory are being worn.

25. The method of claim 22, wherein the wireless charging signal received by the receive coil integrated within the clip of the tether is generated from a power source of having its own battery.

* * * * *